US007308421B2

(12) United States Patent
Raghupathy et al.

(10) Patent No.: US 7,308,421 B2
(45) Date of Patent: Dec. 11, 2007

(54) SYSTEM AND METHOD FOR GROUPING PRODUCTS IN A CATALOG

(75) Inventors: Sri Raghupathy, San Jose, CA (US);
Shankar Sundaram, San Jose, CA (US); Narayanan Vijaykumar, Cupertino, CA (US)

(73) Assignee: Vendavo, Inc., Palo Alto, CA (US)

( * ) Notice: Subject to any disclaimer, the term of this patent is extended or adjusted under 35 U.S.C. 154(b) by 740 days.

(21) Appl. No.: 10/121,816

(22) Filed: Apr. 12, 2002

(65) Prior Publication Data

US 2003/0195810 A1    Oct. 16, 2003

(51) Int. Cl.
*G06Q 20/00*    (2006.01)
(52) U.S. Cl. ............................. 705/20; 705/400; 705/16
(58) Field of Classification Search .................. 705/20, 705/400
See application file for complete search history.

(56) References Cited

U.S. PATENT DOCUMENTS

| 3,806,711 | A |   | 4/1974  | Cousins, Jr. ............. 235/151.3 |
|-----------|---|---|---------|---------------------------------------|
| 5,053,957 | A |   | 10/1991 | Suzuki ....................... 364/405 |
| 5,224,034 | A |   | 6/1993  | Katz et al. .................. 364/401 |
| 5,461,708 | A |   | 10/1995 | Kahn                                   |
| 5,670,984 | A |   | 9/1997  | Robertson et al.                       |
| 5,689,287 | A |   | 11/1997 | Mackinlay et al.                       |
| 5,710,887 | A | * | 1/1998  | Chelliah et al. .............. 705/26  |
| 5,740,448 | A |   | 4/1998  | Gentry et al.                          |
| 5,758,327 | A | * | 5/1998  | Gardner et al. ............... 705/26  |
| 5,808,894 | A | * | 9/1998  | Wiens et al. ................. 700/231 |
| 5,870,717 | A | * | 2/1999  | Wiecha ....................... 705/26  |
| 5,878,400 | A | * | 3/1999  | Carter, III ................... 705/20 |
| 6,320,586 | B1|   | 11/2001 | Plattner et al.                        |
| 6,678,695 | B1| * | 1/2004  | Bonneau et al. ............. 707/102   |
| 6,785,664 | B2| * | 8/2004  | Jameson ...................... 706/47  |
| 6,812,926 | B1|   | 11/2004 | Rugge                                  |

FOREIGN PATENT DOCUMENTS

WO    WO 99/60486    11/1999

OTHER PUBLICATIONS

Murphy, D., "The exciting role of the credit manager in the expanding e-commerce marketplace", Business Credit, vol. 10 No. 9, p. 64, Oct. 2000.*
Spanbauer, S., "You've got e-mail", PC World, vol. 16 No. 6, p. 135, Jun. 1998.*
Marn, Michael V. and Robert L. Rosiello, "Managing Price, Gaining Profit," Harvard Business Review, pp. 84-93 (Sep.-Oct. 1992).
Origin 7.0 Help (including 21 sheets of screen shots), 2000.
Microsoft Excel 2000, 1985-1999.

* cited by examiner

*Primary Examiner*—F. Zeender
*Assistant Examiner*—Christopher Buchanan
(74) *Attorney, Agent, or Firm*—Kang Lim (57) ABSTRACT

An apparatus and method for preparing a price quote for a product. The product is selected from among a plurality of products. A determination is made as to whether the product is a member of a particular product collection. This determination includes evaluating a dynamic selection rule set associated with the particular product collection. When the product is determined to be a member of the particular product collection, the method includes the additional steps of (i) identifying one or more price rules associated with the particular product collection and (ii) applying these price rules to the product in order to determine the price quote for the product.

15 Claims, 4 Drawing Sheets

SYSTEM AND METHOD FOR GROUPING PRODUCTS IN A CATALOG

RELATED APPLICATIONS

This application is related to RULE-BASED SYSTEM FOR DETERMINING PRICE ADJUSTMENTS IN A PRODUCT CATALOG filed on even date herewith, Ser. No. 10/121,803.

The present invention relates generally to a method of pricing products, and particularly to a method of grouping products in an on-line catalog from a pricing perspective using dynamic selection rules.

BACKGROUND OF THE INVENTION

The number of products offered by vendors has historically ranged anywhere from just a few products to a complex array of goods and services spanning multiple product areas or categories. An example of a vendor that offers a complex array of goods and services is Sears Roebuck and company (Hoffman Estates, Ill.; hereinafter "Sears"). To assist the public in wading through the complex array of offered goods and services, vendors such as Sears have traditionally published paper-based price catalogs that list each of the products and services offered as well as their price and other relevant information.

When it was circulated, the Sears catalog provided information such as the price of a large number of household products including hardware, clothing, kitchenware, and jewelry. Although the Sears catalog is no longer circulated, paper-based price catalogs are still presently used by several vendors. For example, paper-based price catalogs are published on an annual basis by numerous chemical companies such as Merck, Aldrich, and Boehringer. However, paper-based price catalogs have a number of drawbacks that make them unsatisfactory for many types of applications. First, prices can only be updated each time the paper-based catalog is published. Often, because of printing and distribution costs, paper-based catalogs are only published on an annual basis. The infrequent distribution of price catalogs not only hampers product pricing, it hampers the introduction of new products and the process of discontinuing products as well. Second, paper-based price catalogs do not provide a satisfactory forum for listing or applying specific discounts, such as favored customer discounts, seasonal discounts, holiday discounts, or volume discounts. Third, distribution of paper-based price catalogs is expensive because the catalog has to be mailed or otherwise physically delivered to customers. To address these and other drawbacks, electronic pricing systems have been developed.

One electronic pricing system is disclosed in U.S. Pat. No. 5,878,400 to Carter (hereinafter "Carter"). Carter discloses systems and methods used to determine the prices of products when the purchaser is a member of a purchasing group and the products are members of product groups. In Carter, purchasing groups are arranged into organizational groups. The organizational groups are arranged into a hierarchy ("organizational group hierarchy") such that an organizational group below an immediately higher organizational group in the hierarchy is a subset of the immediately higher organizational group. Further, products are arranged into product groups. In Carter, the products groups are arranged in another hierarchy, called the "product group hierarchy," such that a product group below an immediately higher product group in the product group hierarchy is a subset of the immediately higher product group. Each organizational group in the organizational group hierarchy and each product group in the product group hierarchy may be assigned a pricing adjustment.

A price quote for a particular product, in the methods disclosed by Carter, is determined by walking through the organizational group hierarchy until the node that reflects the purchaser in the transaction is found. Next, the product group hierarchy is scanned until the particular product is found in the product group hierarchy. A particular product may belong to a number of product groups. Then Carter works up the organizational group hierarchy and the product group hierarchy and identifies all of the organizational groups and product groups that are at higher levels than those selected by the user. All pricing adjustments from each of the organizational groups and product groups that are at higher levels in the organizational group hierarchy and product group hierarchy are collected, in addition to pricing adjustments for the particular product and the particular organizational group, and applied to the product in a given transaction.

Electronic pricing systems such as the one disclosed in Carter remedy many of the disadvantages found in paper-based price catalogs. Using electronic pricing systems, vendors may change prices on a frequent basis and complex discounting algorithms may be used. For instance, electronic pricing systems may be supported by a relational database management system that tracks a complex array of discounts and applies these discounts appropriately as requests for quotes are received. Electronic pricing systems can be used to make the price catalog electronically available on private networks or on public networks such as the Internet. In this manner, customers can readily access the electronic price catalog and vendors can update the catalog as frequently as desired. Furthermore, as described above, electronic pricing systems can be used to organize products and customers in a hierarchical fashion in order to simplify pricing look-up tables.

Although electronic pricing systems provide an enormous advance over paper-based price catalogs, electronic pricing systems, such as the one disclosed by Carter, are still unsatisfactory in practice. The price rules for products offered in electronic pricing systems must be manually adjusted each time the vendor wants to alter a price rule or alter the identity of the products to which the price rule applies. In this context, a price rule is any rule that includes a price rule operator that operates on one or more products or services.

To illustrate the disadvantages of known electronic pricing systems, consider the case in which a vendor identifies a group of products that the vendor wants to discount. The vendor may want to discount the group of products because there is an excessive number of the products in the inventory, the product is about to be discontinued, or the product has become a top selling item. To effectuate this discount, an account administrator must manually update the electronic pricing system to include a new price rule. That is, there is no mechanism within known electronic pricing systems to automatically introduce price rules on a dynamic basis. If the vendor is a company such as Amazon.com that sells books and discounts the top ten selling books at any given time by ten percent, the vendor must introduce a new price rule each time the identity of the top ten selling books changes.

Given the above background, what is needed in the art is improved electronic pricing systems. Such systems should not have the drawback of requiring manual adjustment of the electronic pricing system each time the vendor would like to alter the price rule terms for a class of products or services offered by the vendor.

SUMMARY OF THE INVENTION

In summary, the present invention addresses the drawbacks found in prior art pricing systems. Using the methods and apparatus of the present invention, a vendor defines a collection. In one embodiment, a collection identifies a group of products based on an arbitrary expression that is evaluate dynamically. Such collections are referred to as dynamic collections. Exemplary arbitrary expressions that are evaluated dynamically include, but are not limited to, a time of day a price quote is requested or processed, a relative sales volume of a product, or the inventory level of a product. In this way, a vendor can apply pricing rules to a dynamic class of products. Dynamic collections are advantageous because the price rules for a dynamic class of products can be defined. This is an improvement over prior art systems where manual adjustments are required each time the products are introduced into, or removed from, a class of products. In another embodiment, a collection identifies a group of products using an explicit definition (e.g., a list of products). In addition to price rules associated with collections, and therefore all products within the collection, one or more price rules may be associated with products in a collection.

One aspect of the present invention provides a method of preparing a price quote for a product. The product is selected from among a plurality of products. First, a determination is made as to whether the product is a member of a particular product collection. A collection is a unified method for obtaining products. In one embodiment, a collection makes a static query of a product hierarchy or product list. When static queries are used, the same values are returned every time the query is made. An example of a static query is a request for products "A", "B", and "C" or for all products in product categories "X" and "Y." In another embodiment, a collection makes an arbitrary query of a product hierarchy or product list. The arbitrary query is evaluated dynamically. Such collections are referred to as dynamic collections. An example of an arbitrary query that is evaluated dynamically is a request for any product in which there are more than 500 units of the product in the inventory. When a product is determined to be a member of the product collection, one or more price rules associated with the product collection are applied to the product in order to determine a price quote for the product.

In some embodiments of the present invention, an arbitrary query includes the evaluation of a dynamic selection rule set associated with a particular product collection. In one embodiment of the present invention, the dynamic selection rule set is user determined at a time before a request to generate the price quote is received. In another embodiment, the dynamic selection rule set is evaluated based on at least one condition that includes a dynamic environmental condition. Dynamic environmental conditions in accordance with the present invention include but are not limited to: (i) a time of day the price quote is requested, (ii) a time of day the price quote is processed, (iii) a relative sales volume of the product relative to another product in the product collection, (iv) an absolute inventory level of the product, and (v) an inventory level of the product relative to an inventory level of another product in the collection.

In another embodiment of the present invention, the products in the electronic pricing system are organized into groups (i.e. nodes). In turn, the groups are arranged in a hierarchical manner to form a product hierarchy. The product hierarchy therefore contains a parent group and child groups. The parent group comprises a product category. A product category is a subset of products or services offered by the vendor. The identity of products or services in this category may be determined by a respective predetermined selection rule set. Each child group is either a product collection, product category, or one or more products. The product hierarchy is arranged so that each group below an immediately higher group in the product hierarchy inherits price rules of the immediately higher group.

Another aspect of the present invention provides a computer program product for use in conjunction with a computer system. The computer program product comprises a computer readable storage medium and a computer program mechanism embedded therein. The computer program mechanism comprises a product collection evaluator and a price quote generator. The product collection evaluator determines whether a product selected from among a plurality of products is a member of a product collection. This determination is made by a process that includes evaluating a dynamic selection rule set associated with the product collection. The price quote generator prepares a price quote for the product when the product is determined to be a member of the product collection. The price quote generator prepares a price quote by identifying one or more price rules associated with the product collection. The price quote generator applies the identified price rules associated with the product collection to the product in order to determine a price quote for the product.

Still another aspect of the present invention provides a computer system for preparing a price quote for a product that is selected from among a plurality of products. The computer system comprises a variety of components including a central processing unit and a memory. The memory is coupled to the central processing unit. The memory stores a representation of the plurality of products. The memory also stores a dynamic selection rule set that determines which of the products in the plurality of products are members of a product collection. The memory further stores a plurality of price rules and a variety of modules, including a product collection evaluator module and a price quote generator module. The product collection evaluator module determines whether the product is a member of the product collection. The product collection evaluator module comprises instructions for evaluating the dynamic selection rule set. The price quote generator module prepares the price quote for the product when the product is determined to be a member of the product collection. The price quote generator module includes several instructions, including instructions for identifying one or more price rules associated with the product collection from the plurality of price rules as well as instructions for applying the price rules to the product in order to determine the price quote for the product.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
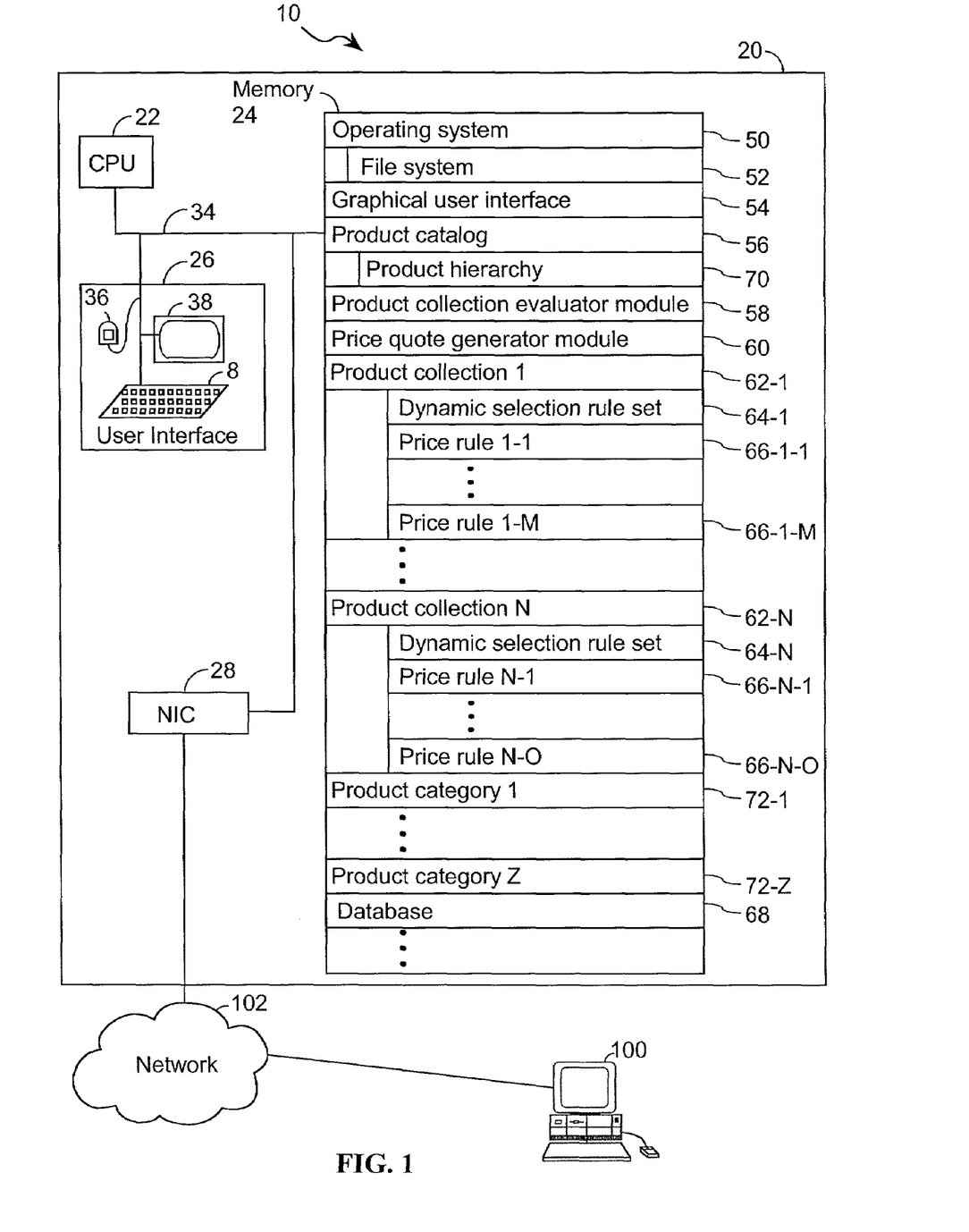
FIG. 1 illustrates a system that is operated in accordance with an embodiment of the invention.

FIG. 1 illustrates a system 10 that is operated in accordance with one embodiment of the invention. System 10 includes one or more client computers 100 and at least one server 20. Client computers 100 and server 20 are connected by a communications network 102. Network 102 is a local area network (LAN), wide area network (WAN), metropolitan area network (MAN), an Intranet, the Internet, or any combination of such networks.

Server 20 includes standard server components including a central processing unit 22, memory 24 (including high speed random access memory as well as non-volatile storage, such as disk storage) for storing program modules and data structures, user input/output device 26, a network interface 28 for coupling server 20 to other computers via communication network 102, and one or more busses 34 that interconnect these components. User input/output device 26 includes one or more user input/output components such as a mouse 36, display 38, and keyboard 8.

Memory 24 includes a number of modules and data structures that are used in accordance with the present invention. It will be appreciated that at any one time during operation of the system, a portion of the modules and/or data structures stored in memory 24 will be stored in random access memory while another portion of the modules and/or data structures will be stored in non-volatile storage. In a typical embodiment, memory 24 includes an operating system 50. Operating system 50 includes procedures for handling various basic system services and for performing hardware dependent tasks. Memory 24 further includes a file system 52 for file management. In some embodiments, file system 52 is a component of operating system 50.

Memory 24 also includes a graphical user interface module 54. Graphical user interface module 54 works in conjunction with network 102 and clients 100 to provide an interface that is used to communicate price quotes to customers, field service representatives, or sales staff. In addition, graphical user interface module 54 provides a mechanism that allows vendors to define groups of products, such as product categories or product collections, as well as to define price rules for such groups. In one embodiment of the present invention, graphical user interface module 54 includes one or more web pages that may be viewed on a client 100 using a web browser such as Internet Explorer (Microsoft, Redmond, Wash.). One or more product catalogs 56 are also stored in memory 24. Each product catalog 56 includes a plurality of products. A product can be goods, services, or any combination of goods and services.

Memory 24 further includes modules that are used to prepare price quotes. These modules include a product collection evaluator module 58 and a price quote generator module 60. Product collection evaluator module 58 determines whether a product is a member of one or more product collections 62 that are stored in memory 24. In one embodiment, each product collection 62 includes a corresponding dynamic selection rule set 64 that defines which of the products, selected from among all products in product catalog 56, are included in the corresponding product collection 62. A dynamic selection rule set 64 is used as the basis for a dynamic query in order to determine which products are in a product collection. As used herein, product collections 62 that make use of a dynamic selection rule set 64 are referred to as dynamic collections.

In some embodiments, each product collection 62 does not have a dynamic selection rule set. Such collections 62 determine which products are a member of the collection by using one or more static rules. When a static rules are used to make a static query, the same products are returned every time the query is made. An example of a static query is a request for products "A", "B", and "C" or for all products in product categories "X" and "Y." In some embodiments, collections use both static and arbitrary rules in order to determine the products within the collection. In such embodiments, the arbitrary rules are dynamically evaluated. An example of an arbitrary rule that is dynamically evaluated is a request for any product in which there are more than 500 units of the product in the inventory.

Regardless of whether static or arbitrary rules are used to determine which products are within a collection 62, when a product is determined to be a member of the product collection, one or more price rules 66 associated with the product collection 62 are applied to the product in order to determine a price quote for the product. To accomplish this, price quote generator module 60 uses the price rules 66 associated with the product collection 62 to determine a price quote for the given product.

Optionally, memory 24 includes a database 68 that is used to organize and store data. For instance, in some embodiments of the present invention, product catalog 56 and/or price rules 66 are stored in database 68. Database 68 is any form of database, such as a relational database. In one embodiment, database 68 is an Oracle (Redwood Shores, Calif.) database such as Oracle 9i or Oracle 7.

Product catalog 56 may optionally be organized into a product hierarchy 70 (FIG. 1). In embodiments in which a product hierarchy 70 is used, the products in the product catalog 56 are organized into groups (i.e. nodes). In turn, the groups are arranged in a hierarchical manner to form product hierarchy 70. Product hierarchy 70 contains a parent group and child groups. The parent group comprises a product category. Each child group is either a product collection, product category, or one or more products. Product hierarchy 70 is arranged so that each group below an immediately higher group in the product hierarchy inherits price rules of the immediately higher group. It is possible for a product to be in more than one category 72. The product hierarchy 70 is arranged so that each group below an immediately higher group in the product hierarchy inherits price rules of the immediately higher group.

Figure 2:
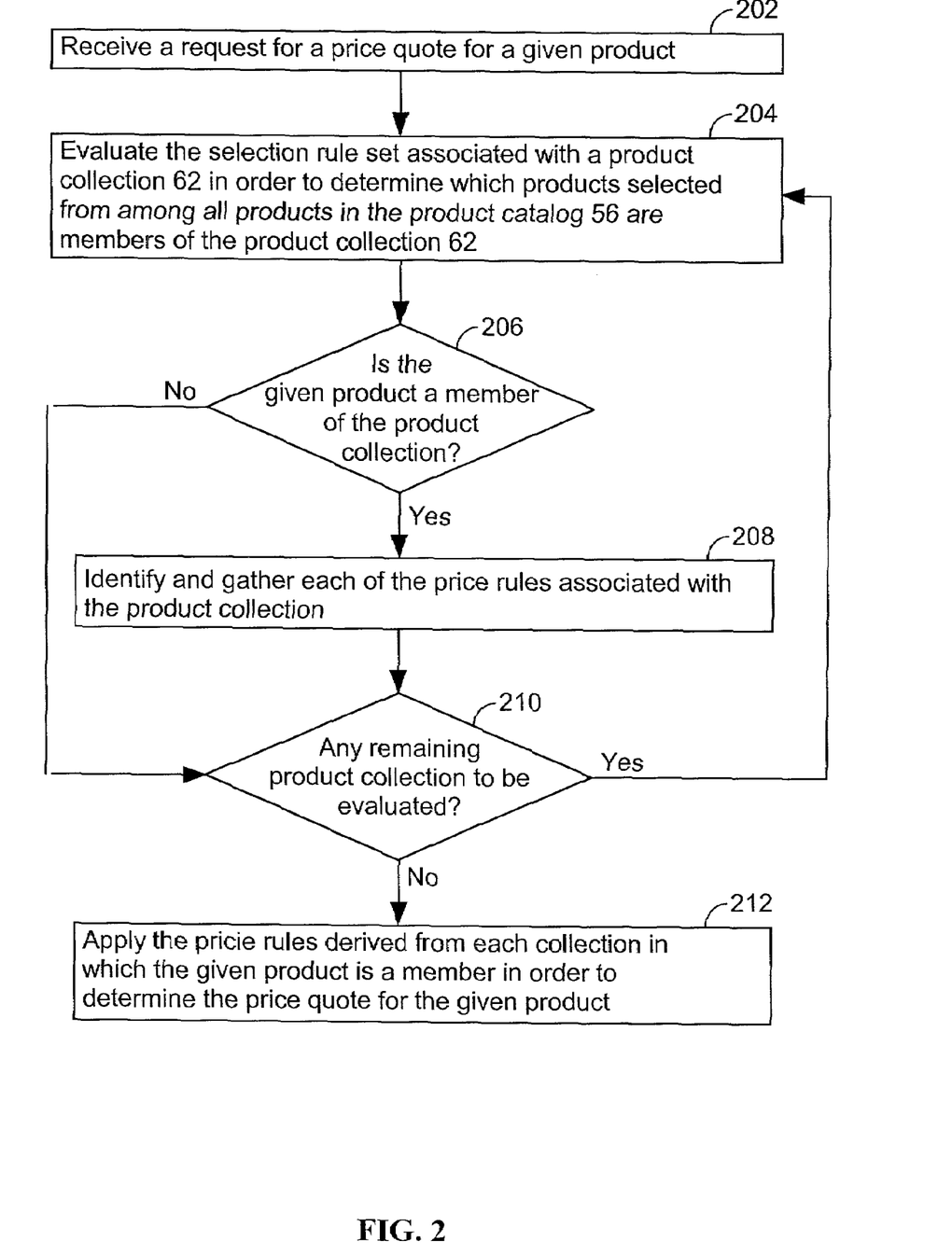
FIG. 2 illustrates the processing steps that are used to generate a price quote for a product that is selected from among a plurality of products in accordance with one embodiment of the present invention.

Referring to FIG. 2, the processing steps used in one embodiment of the present invention to determine the price quote for a given product are provided. In processing step 202, a request for a price quote for a given product is received. In a typical embodiment, the request is generated by a user using graphical user interface 54. That is, a user at a client computer 100 (FIG. 1) uses a web browser to view graphical user interface 54 and to make a request for a price quote for one or more products in product catalog 56.

Next, product collection evaluator module 58 determines whether the given product is a member of any product collection 62. In order to make this determination, the query associated with each product collection 62 in memory 24 is evaluated in order to determine which products belong to each product collection 62. That is, in the case of dynamic collections, the dynamic selection rule set 64 is evaluated to determine which products are in the collection 62. In this context, the dynamic selection rules set 64 is as an arbitrary query that is evaluated on a dynamic basis. In the case of collections 62 that use a static query rather than a dynamic selection rule set, the static query is executed in order to determine which products fall into the collection 62. To perform these tasks, processing steps 204 through 210 are repeated for each product collection 62 in memory 24.

In processing step 204, the dynamic selection rule set 64 (i.e., the arbitrary query) associated with a product collection 62 is dynamically evaluated in order to determine which products, selected from among all products in product catalog 56, are members of product collection 62. Advantageously, dynamic selection rule set 64 may use dynamic environmental conditions that potentially change over time to define which products in product catalog 56 are members of the corresponding product collection 62. Representative environmental conditions include: (i) a time of day when the price quote is requested by a user, (ii) a time of day when the price quote is processed by server 20, (iii) a relative sales volume of the given product relative to another product in the respective product collection 62, (iv) an absolute inventory level of the product, and (v) an inventory level of the product relative to an inventory level of another product in the respective product collection 62. However, such environmental conditions are merely exemplary and are not a comprehensive list of the environmental conditions that may be used to determine which products are in the respective product collection 62. In another embodiment of the present invention, the dynamic selection rule set 64 is determined by the vendor at a time before a request to generate the price quote is received.

Examples of the use of dynamic selection rules sets 64 will now be provided so that the advantages of using product collections 62 is further understood. In one example, a dynamic selection rule set 64 defines the products that are in a product collection 62 as the top ten selling items in product catalog 56 during the past hour. In another example, a dynamic selection rule set 64 defines a product collection 62 as the top ten selling items in product catalog 56 to customers on the West coast that have a household income of more than $50,000 per year. In yet another example of a dynamic selection rule set 64, the product collection 62 is defined as those products in product catalog 56 in which there is at least a three month stock, given the rate at which each respective product has sold in the last forty-eight hours. In another example, a rule may be defined to include a specific product A in a particular product collection C if the time at which the product quote is being requested is between midnight and 3 AM (this might be called the "midnight special" product collection).

It will be appreciated that a dynamic selection rule set 64 may include several rules. Together, the rules in the set 64 determine which products are in a particular product collection. Furthermore, there is no requirement that each rule in dynamic rule set 64 include a dynamic environmental variable. That is, a dynamic selection rule set 64 may combine a rule that includes a dynamic environmental condition ("dynamic rules") and a rule that does not include a dynamic environmental condition ("static rules"). An exemplary dynamic selection rule set 64 that includes both dynamic and static rules is the following:

1. All products in product catalog 56 that are services.
2. All products that have been ordered more than 100 times in the past 8 hours.

In order to determine which products in product catalog 56 are members of the product collection that corresponds to this exemplary dynamic selection rule set 64, rules "1" and "2" are logically combined in a manner specified by the dynamic selection rule set 64. This logical combination may be an "and" or "or" or any other logical operation. Furthermore, the order by which individual rules in dynamic selection rule set 64 are evaluated, or otherwise combined, may be specified. For example, in a dynamic selection rule set 64 having rules A, B, and C, the set 64 may specify that rules A and B are to be combined before considering rule C. Processing steps 204 through 210 is typically repeated until all product collections 62 have been evaluated.

In some instances, a collection 62 does not make use of a dynamic selection rule set 64. In such embodiments, processing step 204 evaluates a static query associated with product collection 62 in order to determine which products selected from among all products in the product catalog 56 are members of the product collection 62.

In processing step 206, the question is asked (i.e., the price quote generator determines) whether the given product, for which a quote has been requested, is a member of the product collection 62 that was evaluated in the last instance of processing step 204. If the product is a member of this product collection 62 (206-Yes), process control passes to processing step 208. In processing step 208, each of the price rules 66 that are associated with the product collection 62 evaluated in the last instance of processing step 204 are identified. In essence, the price rules identified in each instance of processing step 208 are gathered in iterations of processing steps 204 through 210 until control passes to processing step 212.

If the given product for which a quote is requested is not a member of the product collection 62 evaluated in the last instance of processing step 204 (206-No), or processing step 208 has completed, the question is asked whether any remaining product collections need to be evaluated (step 210). If product collections that need to be evaluated remain (210-Yes), processing steps 204 through 210 are repeated. If there are no more product collections 62 that need to be evaluated (210-No), processing control passes to step 212.

In processing step 212, all price rules 66 that were sequentially gathered in each instance of processing step 208 are evaluated in order to compute a price quote for a given product. In some embodiments of the present invention, each dynamic selection rule set 64 specifies when the corresponding product collection 62 is to be evaluated. Thus, for example, a dynamic selection rule set 64 may specify that the dynamic selection rules are to be evaluated daily, each time a request for a product quote is received, or each time the one hundredth request for a product quote is received. In embodiments in which dynamic selection rule set 64 specifies the time interval in which the corresponding product collection 62 is determined, the evaluation process in processing step 204 is skipped when the dynamic selection rule set 64 indicates that it is not time to evaluate the dynamic selection rules in the set. In such instances, process control passes through processing step 204 on to processing step 206 without evaluating the rules in the dynamic selection rule set 64.

In some embodiments of the present invention, each price rule 66 includes a price rule type identifier and at least one rule expression. A price rule type identifier is a user-determined designation such as "West Coast" or "Zeta." A rule expression defines or adjusts the price of a product in the product category by specifying items such as a quantity of a product, a payment term, or a customer class. Illustrative price rules 66 that include a price rule type identifier and at least one expression are:

rule DSORule type DSO price+CofCap()+3%;

rule AverageResaleInLast10Days type Average If Product.averageResale(10)>Product.averageResale(10, 10) then limit lower bound Branch. GPP+2%;

The examples above have the general syntax:

rule "RULE NAME" type "PRICE RULE TYPE IDENTIFIER" "EXPRESSION";

The price rule type identifier feature found in some price rules in accordance with the present invention allows for more complex price rule 66 combination schemes in processing step 212. In particular, operations on price rules 66 based on price rule type may be performed in step 212. For example, in processing step 212, price rules of a first price rule type are ignored if price rules of a second price rule type were gathered during an instance of processing step 208.

Selective usage of price rules collected in successive instances of processing step 208 may be facilitated by the use of pricing schemes. A pricing scheme includes special rules that determine which price rules are applicable to a particular product. The special rules include Inheritance rules, Assertion rules, Connectivity rules, and Arbitration rules. The use of a pricing scheme is particularly useful when each price rule 66 has a rule type identifier and each price rule 66 belongs to a specific product, product category 72 or product collection 62 (FIG. 1). Then, special rules found in a pricing scheme can be used to help resolve which price rules collected in instances of processing step 208 apply to the given product.

Inheritance rules are applied when two or more price rules 66 of the same rule type are applicable to the given product. Inheritance rules may be used to filter out all but one rule of each price rule type for the given product. Assertion rules define which price rules 66 to ignore when a specific price rule 66 or price rule type has been applied. Assertion rules are used, for example, to avoid combining multiple discounts or to override one discount with another. Arbitration rules define the value to use when several price rules 66 are applicable to the given product. This value may be, for example, the maximum or minimum price. Connectivity rules are used to define the interaction between price rules 66 that result in percent adjustments and price rules 66 that result in amount adjustments. Connectivity rules allow for the combination or prioritization of such price rules 66. An example of a Connectivity rules is the following:

cascade percentage then amount

This Connectivity rule applies the percent price adjustment and then it applies the fixed amount price adjustment during processing step 212. For instance, 5 percent and then $3.00. In another example, the special rule cascade amount then percentage applies the fixed amount adjustment and then the percent adjustment. For instance, $3.00 and then 5 percent.

In one example in accordance with FIG. 2, a request for a price quote for a product is received. After evaluating each product collection 62 in memory 24, it is determined that the product is a member of product collection A and product collection B.

The price rules 66 for product collection A are:

rule 1   ListPrice = $1000;
rule 2   if OrderVolumeQuantity <= 500 then ListPrice −5%;
rule 3   if (500 < OrderVolumeQuantity <= 1000) then ListPrice −7%;
rule 4   if 1001 < OrderVolumeQuantity then ListPrice −10%;
The price rules for product collection B are:

rule 5   if SalesRep.type = New then limit lower bound ListPrice −6%.

Accordingly, in determining the price quote for the product, a first instance of processing step 208 gathers rules one through four and a second instance of processing step 208 gathers price rule five. Thus, in processing step 212, price rules one through five are applied to the product in order to compute the price quote for the product.

Figure 3:
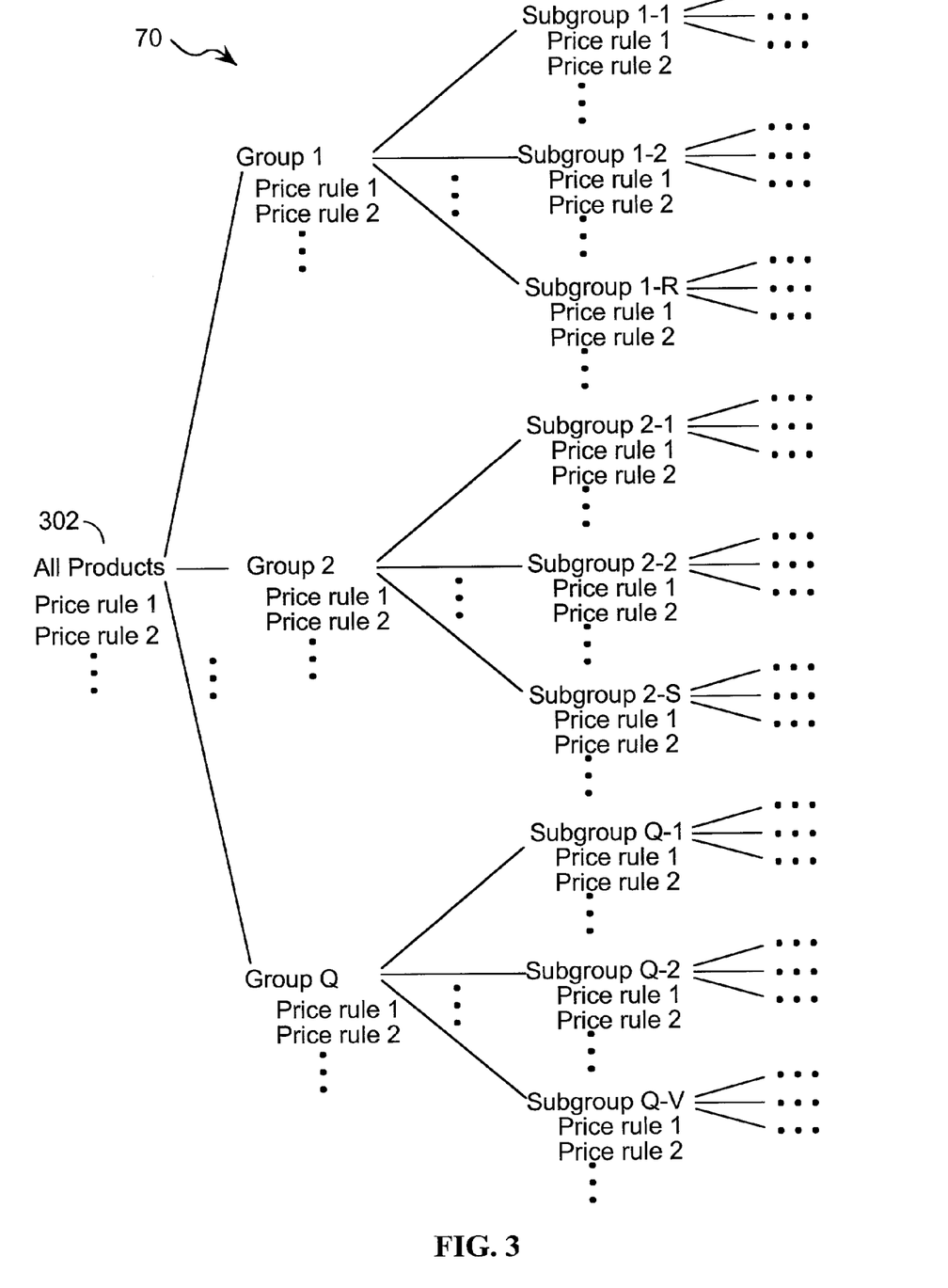
FIG. 3 illustrates a product hierarchy in which a plurality of groups are arranged in a hierarchical manner so that a group below an immediately higher group in the product group hierarchy inherits price rules of the immediately higher group in accordance with one embodiment of the present invention.

FIG. 3 discloses a product hierarchy 70 in accordance with one embodiment of the present invention. The root 302 of product hierarchy 70 is the category "all products," which includes all products in the corresponding product catalog 56. Product hierarchy 70 further includes successive hierarchical layers. In each layer there are one or more groups or subgroups, and in most implementations each layer will have two or more groups or subgroups. Each group or subgroup represents a product collection 62, product category 72, or one or more products. Price rules may be attached to root 302 or to any product category in the product hierarchy. The product hierarchy 70 is arranged so that a group below an immediately higher group in the hierarchy inherits price rules of the immediately higher group. The use of the terms "group" and "subgroup" is interchangeable and is merely used to illustrate the hierarchical nature of product hierarchy graph 70. Thus, there is no distinction between the properties of "groups" and "subgroups." However, the parent group at the top of the product hierarchy is distinguished from all other groups in that is must be a product category 72 rather than a product collection. One of skill in the art will appreciate that there is no requirement that each group have one or more subgroups as illustrated in FIG. 3. Indeed some groups will not have subgroups. Furthermore, some groups will not have any price rules associated with them. In some embodiments, each group includes one or more products and/or one or more price rules. In some embodiments, each group includes one or more subgroups, one or more price rules, one or more products, one or more product collections, and/or one or more product categories.

Figure 4:
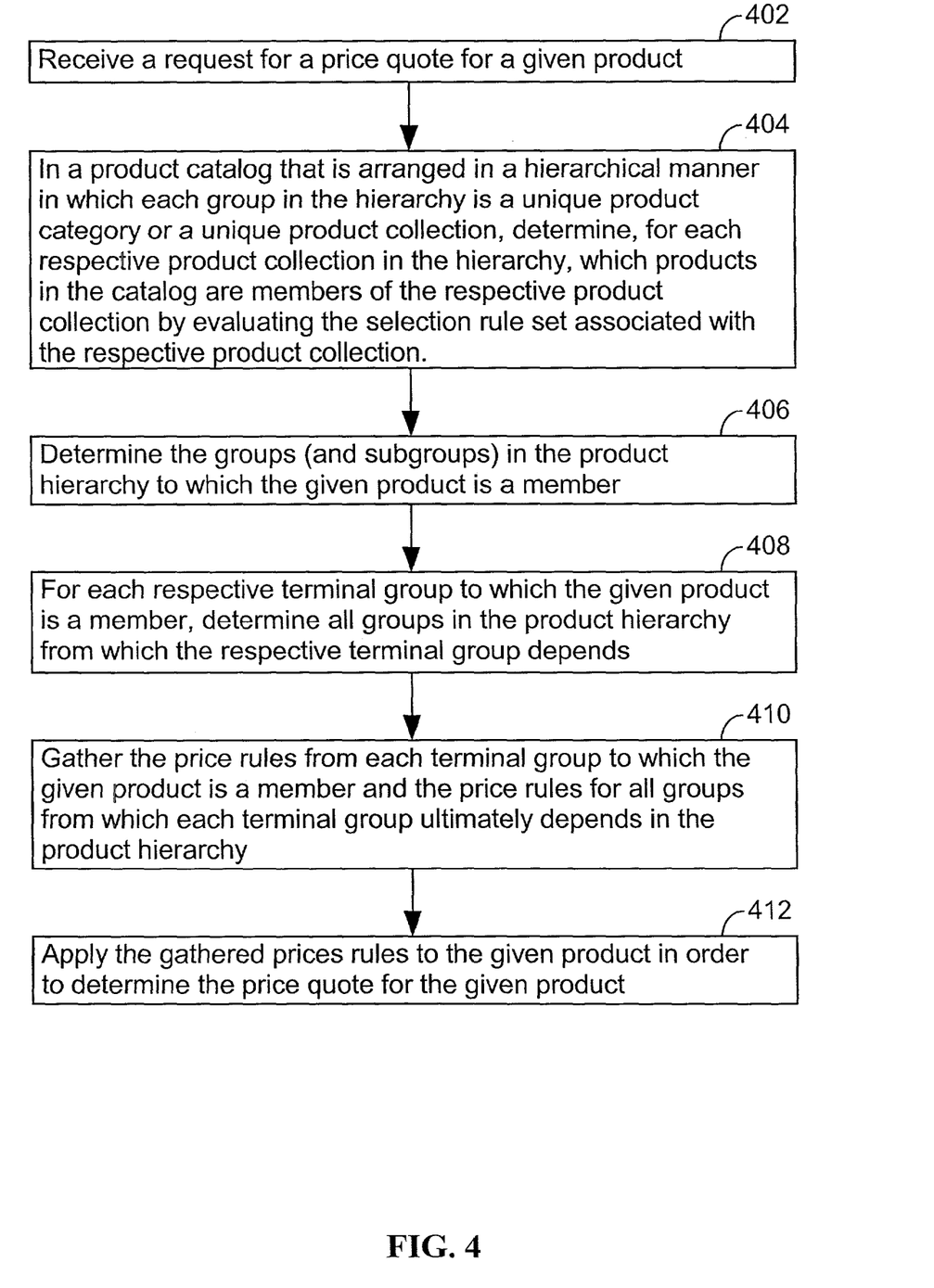
FIG. 4 illustrates the processing steps that are used to generate a price quote for a given product that is selected from among a plurality of products by using a product group hierarchy to determine the price rules that apply to the given product in accordance with one embodiment of the present invention.

FIG. 4 shows processing steps for determining the price quote for a given product using a product hierarchy 70. In processing step 402, a request for a price quote for a given product is received. In a typical embodiment, the request is generated by a user using graphical user interface 54. That is, a user at a client computer 100 (FIG. 1) uses a web browser to view graphical user interface 54 and to make a request for a price quote for one or more products.

Next, in processing step 404, each respective product collection 62 in a product hierarchy 70 is evaluated to determine whether the given product is a member of the respective product collection 62. In order to make this determination, the selection rule set associated with the respective product collection 62 is evaluated. In instances where the collection is a dynamic collection, the selection rule set is a dynamic selection rule set 64. In other embodiments the selection rule set comprises a static query. In some embodiments of the present invention, the dynamic selection rule set 64 associated with dynamic collections indicates the time interval or other conditions under which the corresponding product collection 62 is evaluated in order to determine which products of the product catalog 56 are members of the product collection 62. Accordingly, the present invention imposes no limit or requirement on the number of product collections 62 that are evaluated during processing step 404. Thus, all, some or no product collections 62 in product hierarchy 70 may be evaluated during processing step 404.

It is understood that each group in product hierarchy 70 may be either a (i) product collection 62, (ii) a product category 72, or (iii) one or more products. However, processing step 404 only evaluates product collections 62. This is because product categories are static and only need to be evaluated when system 10 is initialized rather than each time a product quote is requested.

In processing step 406, a determination is made as to which groups in the product hierarchy 70 the given product is a member. For example, a given product "alpha" may be a member of group Q as well as subgroup Q-V. In processing step 408, a determination is made as to which of the groups or subgroups identified in processing step 406 is, in fact, a terminal group. In our example where the given product "alpha" is a member of group Q a well as subgroup Q-V, the terminal group is subgroup Q-V. In more complex examples, where the given product is a member of groups or subgroups in several branches of the product hierarchy 70, there will be multiple terminal groups.

In processing step 410, the price rules from each terminal group to which the given product is a member as well as the price rules for all groups from which each respective terminal group ultimately depends are gathered. Because of the actions of processing step 410, price rules for groups to which the given product is not a member may still be used to determine the price of the given product. This concept is illustrated with an example in which product "beta" is a member of subgroup 1-1 and subgroup Q-1 (FIG. 3). In this case, processing step 410 will gather the price rules associated with subgroups 1-1 and Q-1 as well as the price rules associated with group 1 and group Q. In processing step 412, all price rules that were gathered in processing step 410 are applied in order to compute a price quote for the given product.

The methods of the present invention are advantageous because the vendor can define price rules based on dynamic environmental conditions by defining product collections. Thus, there is no longer a requirement that price rules be manually adjusted each time environmental conditions change. As a result, the electronic pricing systems of the present invention are more responsive to changing market conditions.

ALTERNATE EMBODIMENTS

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system, a method of preparing a price quote for a product that is selected from among a plurality of products, comprising:
   determining whether said product is a member of a particular product collection, including evaluating a dynamic selection rule set associated with said particular product collection; and
   when said product is determined to be a member of said particular product collection, the method further comprising:
   identifying one or more price rules associated with said particular product collection; and
   applying said price rules to said product in order to determine said price quote for said product, wherein said one or more price rules associated with said product collection are determined in accordance with a pricing scheme that is associated with said product collection, wherein said pricing scheme includes at least one inheritance rule to be applied when at least two price rules of said pricing scheme having a similar rule type at different rule levels of a rule hierarchy are applicable to a given product, and wherein the at least one inheritance rule filters out at least one price rule of each of the different rule levels for the given product, at least one assertion rule which defines which of the at least two price rules to ignore when a specific price or price rule type has been applied, at least one arbitration rule for defining a value to use when several price rule are applicable to the given product, and at least one connectivity rule, and wherein the at least one connectivity rule defines interaction between other price rules of said pricing scheme, including combining and prioritizing the other price rules.

2. The method of claim 1, wherein said dynamic rule set is user determined at a time before a request to generate the price quote is received.

3. The method of claim 1, wherein said dynamic selection rule set is evaluated based on at least one condition including a dynamic environmental condition selected from the group consisting of:
   a time of day said price quote is requested,
   a time of day said price quote is processed,
   a relative sales volume of said product relative to another product in said product collection,
   an absolute inventory level of said product, and an inventory level of said product relative to an inventory level of another product in said product collection.

4. The method of claim 1, said plurality of products comprising a plurality of groups that are arranged in a hierarchical manner into a product hierarchy, wherein a group below an immediately higher group in said product hierarchy inherits price rules of said immediately higher group, each group in said plurality of groups comprising a unique product category, and wherein each unique product category is a subset of said plurality of products and is determined by a respective predetermined selection rule set.

5. The method of claim 1, wherein each price rule in said one or more price rules that is associated with said product collection includes a price rule type identifier and at least one rule expression.

6. The method of claim 5, wherein said rule expression includes a component selected from the group consisting of a quantity of a product in said plurality of products, a payment term, and a customer class.

7. The method of claim 1, wherein said product is a service.

8. The method of claim 1, said plurality of products comprising a plurality of groups that are arranged in a hierarchical manner into a product hierarchy, wherein a group below an immediately higher group in said product hierarchy inherits price rules of said immediately higher group, each group in said plurality of groups comprising a unique product collection, and wherein each said unique product collection is a subset of said plurality of products that is determined by a respective dynamic selection rule set.

9. A computerized price quotation system for pricing a product that is selected from among a plurality of products, wherein the price quotation system is configured to:
   determine whether said product is a member of a particular product collection, including evaluating a dynamic selection rule set associated with said particular product collection; and
   when said product is determined to be a member of said particular product collection, the price quotation system is configured to:
   identify one or more price rules associated with said particular product collection; and
   apply said price rules to said product in order to determine said price quote for said product, wherein said one or more price rules associated with said product collection are determined in accordance with a pricing scheme that is associated with said product collection, wherein said pricing scheme includes at least one inheritance rule to be applied when at least two price rules of said pricing scheme having a similar rule type at different rule levels of a rule hierarchy are applicable to a given product, and wherein the at least one inheritance rule filters out at least one price rule of each of the different rule levels for the given product, at least one assertion rule which defines which of the at least two price rules to ignore when a specific price or price rule type has been applied, at least one arbitration rule for defining a value to use when several price rule are applicable to the given product, and at least one connectivity rule, and wherein the at least one connectivity rule defines interaction between other price rules of said pricing scheme, including combining and prioritizing the other price rules.

10. The price quotation system of claim 9, wherein said dynamic rule set is user determined at a time before a request to generate the price quote is received.

11. The price quotation system of claim 9, wherein said dynamic selection rule set is evaluated based on at least one condition including a dynamic environmental condition selected from the group consisting of:
   a time of day said price quote is requested,
   a time of day said price quote is processed,
   a relative sales volume of said product relative to another product in said product collection,
   an absolute inventory level of said product, and
   an inventory level of said product relative to an inventory level of another product in said product collection.

12. The price quotation system of claim 9, wherein each price rule in said one or more price rules that is associated with said product collection includes a price rule type identifier and at least one rule expression.

13. The price quotation system of claim 12, wherein said rule expression includes a component selected from the group consisting of a quantity of a product in said plurality of products, a payment term, and a customer class.

14. The price quotation system of claim 9, wherein said product is a service.

15. The price quotation system of claim 9, said plurality of products comprising a plurality of groups that are arranged in a hierarchical manner into a product hierarchy, wherein a group below an immediately higher group in said product hierarchy inherits price rules of said immediately higher group, each group in said plurality of groups comprising a unique product collection, and wherein each said unique product collection is a subset of said plurality of products that is determined by a respective dynamic selection rule set.

* * * * *